United States Patent
Goossens et al.

(10) Patent No.: US 7,108,242 B2
(45) Date of Patent: Sep. 19, 2006

(54) SEAT VALVE

(75) Inventors: Andre F. L. Goossens, Rumst (BE); Luc van Himme, Zaffelare (BE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/510,857

(22) PCT Filed: Apr. 28, 2003

(86) PCT No.: PCT/EP03/04423

§ 371 (c)(1),
(2), (4) Date: Oct. 12, 2004

(87) PCT Pub. No.: WO03/093711

PCT Pub. Date: Nov. 13, 2003

(65) Prior Publication Data
US 2005/0151104 A1    Jul. 14, 2005

(30) Foreign Application Priority Data
May 2, 2002   (DE) ................................ 102 19 673
Nov. 21, 2002 (DE) ................................ 102 54 341

(51) Int. Cl.
F16K 31/02    (2006.01)
(52) U.S. Cl. ................. 251/129.15; 29/523; 29/888.44; 29/890.124
(58) Field of Classification Search .......... 251/129.15, 251/365; 29/888.44, 888.41, 888.46, 523, 29/46, 890.124
See application file for complete search history.

(56) References Cited

U.S. PATENT DOCUMENTS

| 3,685,124 | A | * | 8/1972  | Wuertz ........................ 29/240 |
| 4,220,034 | A | * | 9/1980  | Pogonowski ................. 29/523 |
| 4,319,393 | A | * | 3/1982  | Pogonowski ................. 29/523 |
| 4,915,350 | A | * | 4/1990  | Babitzka et al. ....... 251/129.15 |
| 4,944,486 | A | * | 7/1990  | Babitzka ................ 251/129.21 |
| 5,428,883 | A | * | 7/1995  | Stieglitz ................ 251/129.15 |
| 5,577,322 | A | * | 11/1996 | Ohshita et al. ......... 251/129.15 |

FOREIGN PATENT DOCUMENTS

| DE | 196 11 832 A1 | 10/1997 |
| DE | 199 17 756 A1 | 1/2000  |
| DE | 199 51 665 A1 | 5/2001  |
| DE | 100 27 171 A1 | 8/2001  |
| DE | 100 64 169 A1 | 2/2002  |
| DE | 101 17 610 A1 | 7/2002  |
| GB | 677637        | 8/1952  |

OTHER PUBLICATIONS

International Search Report of Application No. PCT/EP03/04423 dated Aug. 22, 2003.
German Search Report of Application No. 102 54 341.0 dated Feb. 27, 2003.

* cited by examiner

*Primary Examiner*—John Bastianelli
(74) *Attorney, Agent, or Firm*—RatnerPrestia

(57) ABSTRACT

A seat valve in a motor vehicle wheel slip control system includes a valve tappet acting as a valve closure member, where the valve tappet is movably guided and aligned with a valve seat member by a centering sleeve that guides the valve tappet. The centering sleeve is articulated at the valve seat member.

8 Claims, 2 Drawing Sheets

SEAT VALVE

TECHNICAL FIELD

The present invention relates to a seat valve, in particular an electromagnetically operated seat valve in a motor vehicle wheel slip control system.

BACKGROUND OF THE INVENTION

DE 101 00 744 A1 discloses a seat valve of the generic type in the shape of a solenoid valve having a valve tappet arranged between the magnetic armature and the valve seat member that is guided in a centering sleeve, which is press fitted to a hollow cylinder stepped in its outside diameter and, as a component of the valve seat member, facing the valve tappet.

The smallest radial clearance necessary between the valve tappet and the centering sleeve is influenced by the eccentricity of the sealing edge at the valve tappet in relation to the outside diameter of the hollow cylinder and by the eccentricity of the centering bore in the centering sleeve in relation to the attachment of the centering sleeve at the outside diameter of the hollow cylinder. The result is the necessity and the disadvantage that the minimum radial clearance required for the self-centering of the valve tappet generally must be selected to be large. With an increasing radial clearance in the centering sleeve, however, the valve noise increases, which is based on the transverse force active at the magnet armature and causing an undesirable armature offset during electromagnetic energization and, thus, an undesirable structure-borne noise.

Therefore, an object of the invention is to improve a seat valve of the generic type in such a way that the above-mentioned shortcomings are avoided, while maintaining a design as simple as possible. To this end it is required to diminish the minimum radial clearance in the centering sleeve.

DETAILED DESCRIPTION OF THE PREFERRED EMBODIMENTS

Figure 1:
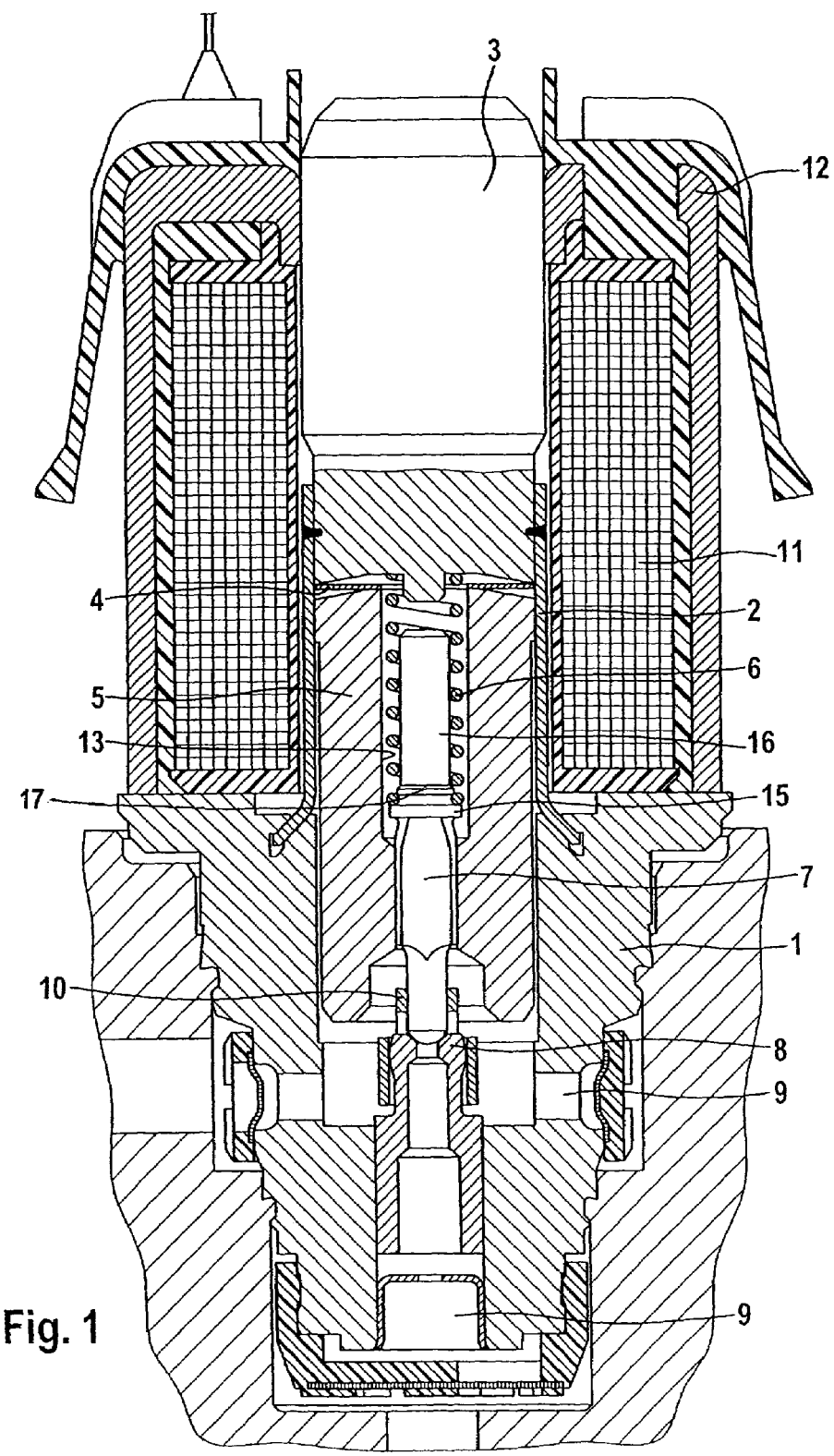
FIG. 1 is a longitudinal cross-section taken through a solenoid valve that is closed in its non-energized basic position.

FIG. 1 shows a solenoid valve that is closed in its non-energized basic position and whose valve housing 1 exemplarily has a cartridge-type construction. The mid-portion of valve housing 1 is configured as a thin-walled valve sleeve 2, which is seal-tightly closed by means of a plug-shaped magnet core 3.

When desired or required, the valve sleeve 2 can be closed like a dome, in contrast to FIG. 1, so that then the cylindrical magnet core 3 without a sealing function is secured in the dome area.

For the purpose of analog operation of the solenoid valve, an annular-disc-shaped spring element 4 is disposed below the magnet core 3 in the present invention and bears loosely against the outside edge of the concavely shaped end surface of the piston-shaped magnet armature 5. In consideration of the magnet armature stroke, the thickness of the spring element 4 corresponds to the necessary dimensions of the residual air slot of the magnet armature so that in the electromagnetically non-energized valve switching position according to the drawings, the spring element 4 has an axial distance to the convexly shaped end surface of the magnet core 3.

Figure 2:
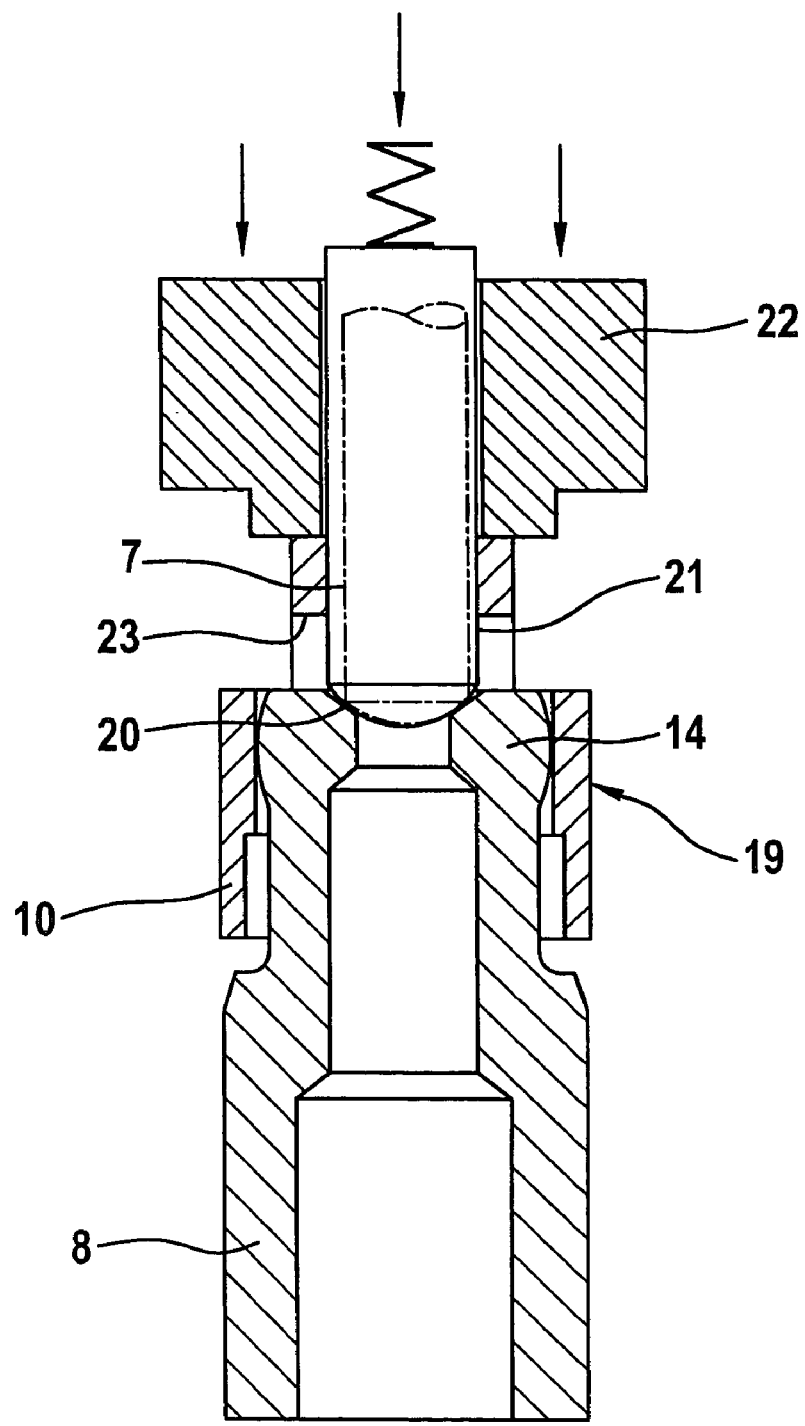
FIG. 2 is an enlarged view of the details of the solenoid valve illustrated in FIG. 1 that are essential for the invention.

The magnet armature 5 accommodates within a stepped bore 13 a per se known spring 6 which, in its capacity as a compression spring, extends with its one coil end through the opening in the spring element 4 towards the end surface of the magnet core 3. Consequently, the magnet armature 5 is urged, under the effect of spring 6, at the opposed magnet armature end surface with the valve tappet 7 against a valve seat member 8 in the valve housing 1, with the result that a pressure fluid channel 9 that extends through the valve housing 1 in horizontal and vertical directions is interrupted in the electromagnetically non-energized valve position. The valve tappet 7 active in the function of a valve closure member is fixed by means of a press fit in the stepped bore 13 of the magnet armature 5 and centered at its end portion facing the valve seat member 8 in a centering sleeve 10 in the direction towards the sealing seat 20. Likewise the sleeve-shaped valve seat member 8 is attached by means of a press fit in the pressure fluid channel 9 of the cartridge-like valve housing 1. The centering sleeve 10 is penetrated by transverse bores 23 above the sealing seat 20 in order to allow in the open position of the valve tappet 7 a simplest possible pressure fluid connection to the pressure fluid channel 9 provided as a valve inlet and outlet channel in the valve housing 1. Above the transverse bores 23 is the sleeve portion of the centering sleeve 10 envisaged for guiding the valve tappet 7 and having an inside diameter that is adapted to the diameter of the valve tappet 7. Another objective of the sleeve portion is to accommodate the assembly force exerted by means of an assembly tool 22 for fastening the centering member 10 to the valve seat member 8, as can be seen in FIG. 2.

Further, the valve tappet 7 includes a disc-shaped step 15 on which the end of spring 6 remote from magnet core 3 is supported. A guiding pin 16 that extends into the spring 6 designed as a helical spring succeeds the step 15 in the direction of the magnet core 3. In order to radially support spring 6 so that lateral buckling of spring 6 is prevented, the diameter of the guiding pin 16 is chosen to be only slightly smaller than the inside diameter of the spring 6 designed as a helical spring.

Guiding the spring 6 directly at the guiding pin 16 instead of in bore 13 is advantageous in terms of manufacturing technology because the guiding pin 16 is easier to finish than the bore wall, when required. A transition area 17 is provided between the step 15 and the guiding pin 16 for the operative and/or form-locking attachment of the end of spring 6 facing the valve tappet 7. The transition area 17 is produced by an annular groove into which the one end of spring 6 is snapping. The spring 6 pertaining to the valve tappet 7 is held captive thereby. It forms a pre-assembled and already exactly adjusted subassembly in conjunction with the valve tappet 7 inserted into the magnet armature 5.

The magnetic circuit can be closed by energizing a valve coil 11 fitted to the valve housing 1 and a yoke ring 12 enclosing valve coil 11 so that the magnet armature 5 moves in the direction of the magnet core 3. The result is that the interposed spring element 4 is elastically deformed and moves to abut on the magnet core 3 where it abuts with its full surface on the inclined end surfaces of the magnet core 3 and the magnet armature 5. The magnet armature 5 is automatically slowed down due a spring force of spring element 4 that is opposed to the movement of the magnet armature 5, before it can urge the spring element 4 against the end surface of the magnet core 3.

Designing the spring element 4 as a particularly flat spring washer or also as a cup spring advantageously results in a progressive spring characteristic curve which, in addition to the actual design of the solenoid valve as a two-position valve, permits a functional extension of a two-position valve as a solenoid valve of analog or proportional operation which is surprisingly simple especially in terms of control technique. The progressive spring element 4 quasi effects a linearization of the magnet armature force.

Upon termination of the electromagnetic energization, the preloading force of the spring element 4 additionally brings about a quickest possible resetting of the magnet armature 5 out of the end position at the magnet core 3 because the so-called sticking of the magnet armature on the magnet core, which is normally caused by remanence, is omitted due to the resetting tendency of the spring element 4.

Irrespective of the embodiment and mode of operation of the above-mentioned solenoid valve chosen, be it as a two-position valve of binary operation or a valve of analog operation, the invention provides that the centering sleeve 10 is articulated at the valve seat member 8.

According to an enlarged illustration of FIG. 2, the valve seat member 8 has a stepped sleeve portion 14 whose peripheral surface has either a concave or a convex shape in the area of contact with the inside wall of the stepped centering sleeve 10 in order to constitute a hinge connection (comparable with a Cardan joint).

The centering sleeve 10 along with the sleeve portion 14 establishes a press fit connection in the area of the hinge connection 19, and the friction force prevailing in the press fit connection is at least as high as a transverse force acting at the valve tappet 7 during the electromagnetically energized valve stroke. The friction force chosen in a corresponding quantity prevents an inadvertent readjustment after the single centering operation of the centering sleeve 10 in relation to the sealing seat 20. The coaxial alignment of the centering sleeve 10 with respect to the sealing seat 20 is carried out in a simple, yet nevertheless precise manner by means of a plug gauge 21.

To maintain a minimum guiding clearance of the valve tappet 8 in the centering sleeve 10, the diameter of the plug gauge 21 corresponds to the maximum outside diameter of the valve tappet 1 plus the double maximum eccentricity of the spherical segment in relation to the stem of the valve tappet 7.

The hinge connection 19 is configured as a spherical joint, to what end a spherical part shaped as a spherical segment is formed at the sleeve portion 14 of the valve seat member 8 onto which the centering sleeve 10 is seated.

The hinge connection 19 is arranged at the outside periphery of the valve seat member 8, namely at the level of the funnel-shaped sealing seat 20 which is provided at an end of the valve seat member 8 facing the valve tappet 7.

In FIG. 2, the centering sleeve 10 fastened at the valve seat member 8 and provided for the solenoid valve illustrated in FIG. 1 is shown directly after the completion of the assembly and the adjustment of the centering sleeve 10 by means of the plug gauge 21 that bears against the sealing seat 20 and centers the assembly tool 22 of tubular design. To illustrate the chosen large-size outside diameter of the plug gauge, the smaller-diameter valve tappet 7 is further indicated in sections (however, not in a correct scale) in dotted lines in an eccentric position, the valve tappet's valve closure member exhibiting the shape of a spherical segment that abuts on the sealing seat 10.

The plug gauge 21 is used to center the centering sleeve 10 in relation to the sealing seat 20, said plug gauge being aligned coaxially in relation to the sealing seat 20 and being pressed against the spherical sealing seat 20 by means of a spring that is symbolically shown. Subsequently, the centering sleeve 10 is displaced along the plug gauge 21 by means of an assembly tool 22, and the necessary displacement force of the assembly tool 22 is chosen at such a rate that the desired frictional fixation of the hinge connection 19 to be provided between the centering sleeve 10 and the valve seat member 8 is achieved. Thereafter, the plug gauge 21 with the assembly tool 22 is removed so that the subassembly composed of the valve seat member 8 and the centering sleeve 10 can be inserted into the valve housing 1.

In the present embodiment, the tubular valve seat member 8 includes a spherical or crowned swivel head at the level of the sealing seat 20. Constructive modifications are also possible without departing from the idea of the invention for designing a hinge connection 19 between the valve seat member 8 and the centering sleeve 10.

The invention claimed is:

1. A seat valve for a motor vehicle wheel slip control system comprising a valve tappet acting as a valve closure member movably guided and aligned to a valve seat member by means of a centering sleeve, wherein the centering sleeve is articulated at the valve seat member.

2. The seat valve as claimed in claim 1,
wherein the valve seat member includes a sleeve portion whose peripheral surface has a concave or a convex shape in the area of contact with the inside wall of the centering sleeve in order to constitute a hinge connection.

3. The seat valve as claimed in claim 2,
wherein the centering sleeve forms a press fit connection along with the sleeve portion in the area of the hinge connection, and the friction force prevailing in the press fit connection is at least as high as a transverse force acting at the valve tappet during an electromagnetically energized valve stroke.

4. The seat valve as claimed in claim 2,
wherein the hinge connection is configured as a spherical joint, to what end a spherical part shaped as a spherical segment is formed at the sleeve portion of the valve seat member, onto which the centering sleeve is seated.

5. The seat valve as claimed in claim 3,
wherein the hinge connection is configured as a spherical joint, to what end a spherical part shaped as a spherical segment is formed at the sleeve portion of the valve seat member, onto which the centering sleeve is seated.

6. The seat valve as claimed in claim 4,
wherein the hinge connection is arranged at the outside periphery of the valve seat member at the level of a funnel-shaped sealing seat which is provided at an end of the valve seat member facing the valve tappet.

7. The seat valve as claimed in claim 6,
wherein the centering sleeve is aligned coaxially relative to the sealing seat by means of a plug gauge.

8. A method for the assembly and adjustment of a centering sleeve at a valve seat member for an electromagnetically operated seal valve in a motor vehicle wheel slip control system, said method comprising the steps of:
coaxially aligning and pressing a plug gauge against a sealing seat, displacing the centering sleeve along the plug gauge until the frictional fixation of a hinge connection provided between the centering sleeve and the valve seat member is achieved, pulling the plug gauge out of the centering sleeve, and fitting the subassembly comprising the valve seat member and the centering sleeve into a housing of the valve.

* * * * *